July 23, 1940.   R. B. HOUPLAIN   2,209,122
CONTROL DEVICE WITH ADJUSTABLE REVERSIBILITY
Filed June 22, 1937   3 Sheets-Sheet 1
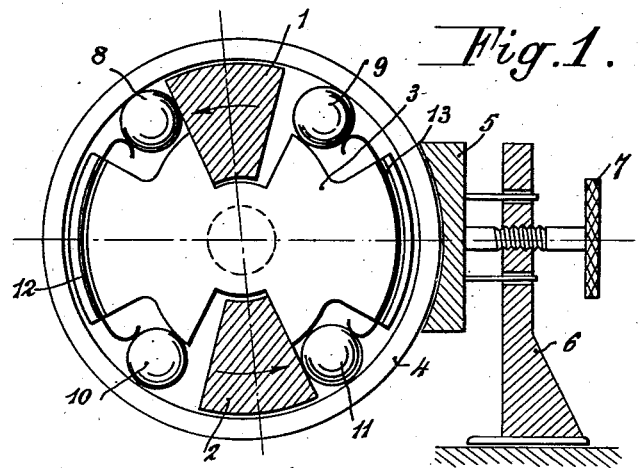
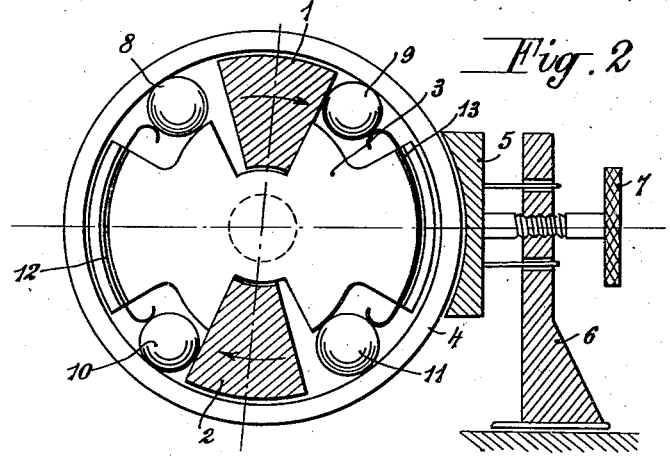
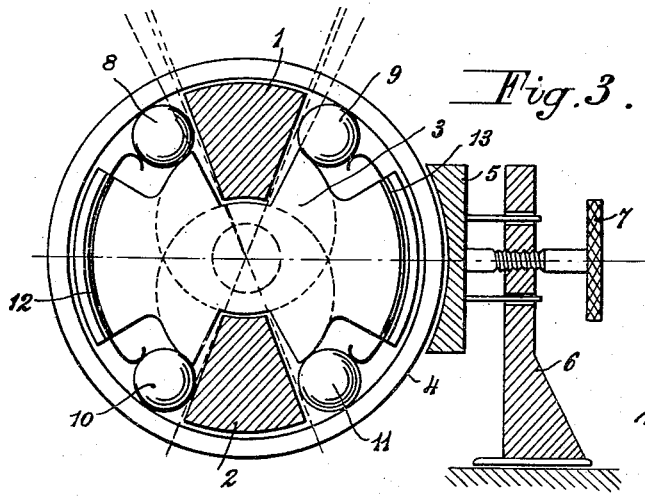
Inventor
René B. Houplain July 23, 1940.  R. B. HOUPLAIN  2,209,122
CONTROL DEVICE WITH ADJUSTABLE REVERSIBILITY
Filed June 22, 1937   3 Sheets—Sheet 3
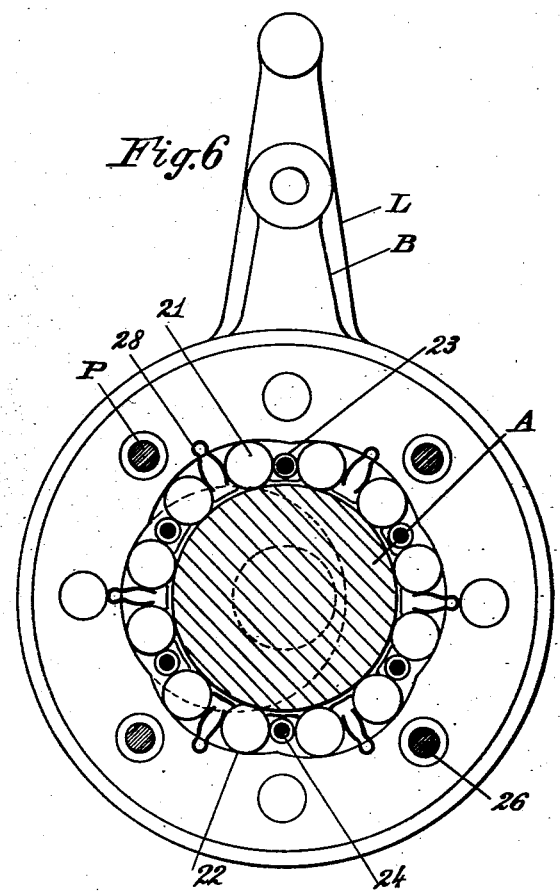
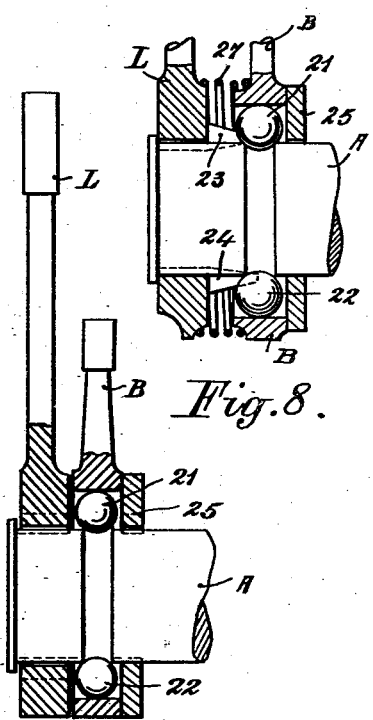
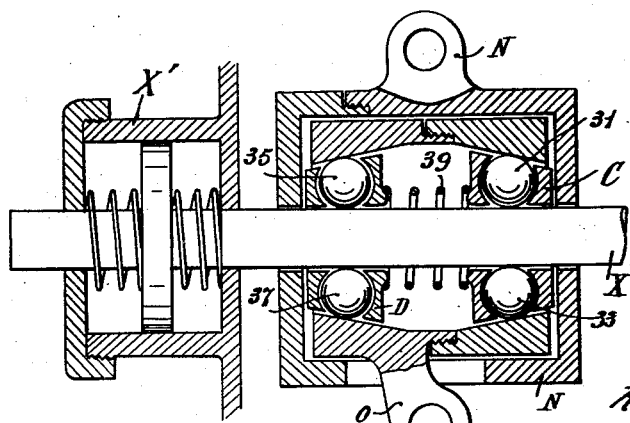
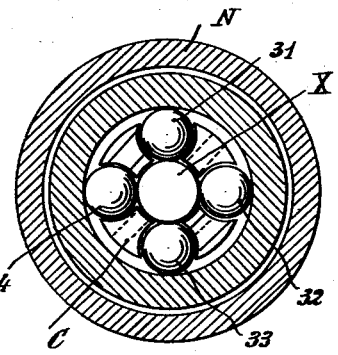
Inventor:
Rene B. Houplain Patented July 23, 1940

2,209,122

UNITED STATES PATENT OFFICE 2,209,122

CONTROL DEVICE WITH ADJUSTABLE REVERSIBILITY

René Benjamin Houplain, Paris, France

Application June 22, 1937, Serial No. 149,706
In France June 29, 1936

9 Claims. (Cl. 192—8)

The device forming the subject-matter of the present invention is essentially constituted by a mechanism interposed between a shaft or a mechanical member controlling the displacement of another shaft or of another mechanical member the reactions of which are to be braked, annulled, or even utilised. For instance, control of the steering gears in motor cars, motorcycles, etc.; control of hand brakes, shock absorbers—for airplanes; control of the steering members, lifting of the pilot's seat and for any mechanical control in general and in particular in hoisting apparatus, lifts, hoists, overhead travelling cranes, cranes, lifting jacks, etc., where irreversibility is necessary. The present device combined with reversible gearing down devices allows of rendering them irreversible and consequently of causing them to have the advantages resulting from the high mechanical efficiency of reversible gearing down devices. By extension, the present device can also serve: (1) for maintaining, solely at the operator's desire, such determined and variable position of adjustment of any control, either for gases, air, ignition, etc., (2) for the automatic connection of adjusting apparatus; (3) for allowing the actuation or control of an auxiliary device, for instance: air compressor on lorry when the driving shaft has a tendency to be driven by the driven shaft.

Several embodiments of the invention have been illustrated, quite diagrammatically and by way of example only, in the accompanying drawings.

Figs. 1, 2, 3 show the general construction of the device forming the subject-matter of the invention.

Figs. 6, 7, 8 show the application of the device to small controls.

Figs. 9, 10 show the application of the device to a rectilinear or curvilinear control.

Figure 5:
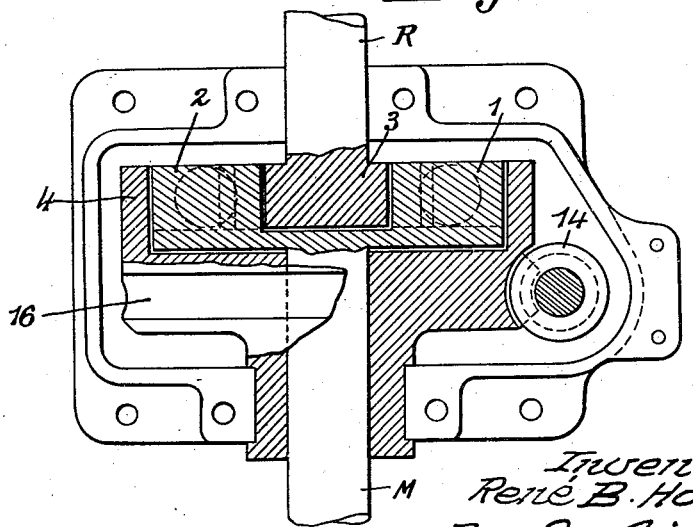

The device comprises a driving shaft rigid with two driving fingers 1 and 2, shown more particularly in Fig. 5, and a driven shaft on which is rigidly secured a sleeve 3, the whole being enclosed in a drum 4 which can freely rotate or be braked by a brake shoe the adjustable pressure of which can reach complete locking. The shoe 5 is mounted on a fixed frame 6, the pressure of the shoe on the drum taking place by means of a screw 7 of an electric, pneumatic, or partial vacuum distant control. The driven sleeve 3 is provided with recesses formed to receive therein balls (or rolls, rollers, needles) symmetrically arranged relatively to the driving fingers—one recess on each side of the fingers 1 and 2. The balls 8, 9, 10 and 11 placed in the recesses are held against an eccentric incline formed by machining on the driven sleeve 3 and forming with drum 4 a V-shaped housing in which this ball (or roll, roller, needle) is pushed by the spring 12 for balls 8 and 10, and by the spring 13 for balls 9 and 11, producing the locking of the driven sleeve 3 with the drum 4.

Fig. 1 shows a diagrammatic sectional elevation of the device, on the driving side, the driving shaft rigid with the fingers 1 and 2 begins to transmit an angular displacement from right to left relatively to the axis, as indicated by the arrow.

Fig. 2 shows the same section, the driving shaft rigid with the fingers 1 and 2 begins to transmit an angular displacement from left to right, relatively to the axis, as indicated by the arrow.

As shown in Fig. 3, same section, the driving shaft rigid with the two fingers 1 and 2 is illustrated in this figure in the position of rest, that is to say, not exerting any stress on the sleeve 3 fast on the shaft to be driven.

*Operation.*—Assuming the driving shaft rigid with fingers 1 and 2 exerts a stress in the direction of the arrow (indicated in Fig. 1 from right towards the left), it will be seen that the finger 1 will push and unwedge the ball 8, likewise, the finger 2 will push and unwedge the ball 11, and will then come in contact with the sleeve 3, the balls 9 and 10 always having a tendency to unwedge since the eccentricity of their recess allows them to be driven in this direction; the drum 4 will remain at rest.

Fig. 2 for the same reasons explains the operation of the device for the actuation from left to right: the fingers 1 and 2 unwedge the balls 9 and 10, actuate the shaft 3 which freely rotates without driving the drum 4 since the balls 8 and 11 have always a tendency to unwedge owing to the shape of their recess or housing.

In Fig. 3, the driving shaft being free, the fingers 1 and 2, provided with slight play, do not transmit any stress to balls 8, 9, 10 and 11 which wedge, by the action of their respective springs 12 and 13, between the sleeve 3 and the drum 4.

When the sleeve 3 is subjected to an external force from left to right, it will be rendered rigid with the drum 4 by the balls 9 and 10 which, as shown by the wedging principle, will tend to drive the drum 4 and will lock the sleeve 3 relatively to the drum 4. The same action will take place when the sleeve 3 is subjected to an external force from right to left. It will be rendered rigid with drum 4 by balls 8 and 11.

Assuming that a sufficient pressure has been exerted by the screw 7 on the shoe 5 acting on drum 4 for locking it, it will be seen that no stress can be transmitted by sleeve 3 to driving fingers 1 and 2, this proving the irreversibility of the device described, either from left to right or from right to left.

When the shoe 5 does not exert any pressure on drum 4, the latter freely rotates, the shaft corresponding to sleeve 3 will freely transmit the stress to driving fingers 1 and 2. At this moment, the adjustment will correspond to 100% reversibility. All the intermediate ranges can be obtained by varying the pressure exerted by shoe 5 on drum 4.

If these springs, etc., are sufficiently powerful for transmitting all the driving torque, the sleeve 3 need no longer be directly engaged by fingers 1 and 2.

If Figs. 1, 2, 3 are again examined, it will be seen that when the driving shaft is driven by the driven shaft, the drum 4 is actuated—case of open brake shoes—the shafts will rotate at the same speed as drum 4, which can be rendered rigid, by means of a belt, gear, friction or any other transmission, with an apparatus the operation of which can be intermittent and in this way, the energy due to the inertia of the members in movement when the engine stops, can be recovered or utilised.

Figure 4:
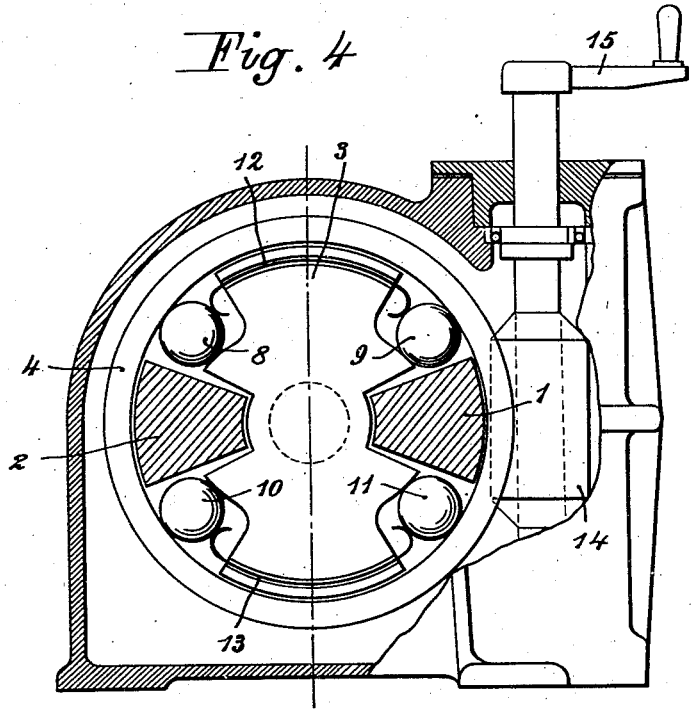
Figs. 4 and 5 are a sectional elevation and a horizontal section and show the application of the device to the control of two shafts with adjustment by means of an auxiliary gearing down device actuated by hand or by an engine: the crank illustrated can be replaced by coupling to an engine.

*Example of application.*—Figs. 4 and 5 show the drum 4 as forming one piece with a toothed crown wheel 16 driven by the worm 14 which can be caused to rotate by a crank 15 (or by any engine) rigid with the worm 14.

When the shaft M corresponding and connected to fingers 1 and 2 is set in motion, it drives the shaft R corresponding and connected to sleeve 3 which cannot drive the shaft M (fingers 1 and 2) as seen by the explanation of the principle, as drum 4 is rigid with the crown wheel 16 the rotation of which is controlled by the worm 14; the actuation of shaft R (sleeve 3) takes place at the same speed as that imparted to shaft M (fingers 1 and 2). When the worm 14 is set in rotation by the crank 15, the shafts M, R corresponding to fingers 1 and 2, and sleeve 3, are driven according to the ratio necessary for the desired application between the crown wheel and the worm. The accurate adjustment can therefore be effected by means of crank 15 owing to the automatic connection of the gearing down device with both shafts M and R when the driving shaft no longer drives the driven shaft.

When the crank 15 is actuated, or the engine replacing the same, for driving the drum 4, the shaft corresponding to sleeve 3 is driven by the wedging of the respective balls for the driving direction, the actuation of the shaft corresponding to fingers 1 and 2 being effected through the medium of the balls, it may happen that the springs 12 and 13 which act on the balls become too weak for driving fingers 1 and 2 without yielding, owing, for instance, to the increase of the inertia of the members rigid with the driving shaft or to the increase of the speed of adjustment.

The present device is only diagrammatically illustrated in Figs. 1, 2, 3, 4 and 5. It comprises driving fingers provided with rollers, rolls, balls or needles, according to its applications, at the points of contact with the rollers, rolls, balls, needles, producing wedging, in order to eliminate the frictions of sliding movements.

The eccentric inclines of sleeve 3 can be provided with ball bearings against which can wedge the balls 8, 9, 10, 11, or other wedging members.

Likewise, the device can operate with any number of driving fingers, that is to say, 3, 4, 5, 6, 7 fingers, etc. The arrangement and shape of the recesses and of the driving fingers can vary according to the application.

When the coupling between the driving fingers and the sleeve 3 is ensured by springs or other resilient members, the sleeve 3 can advantageously have the shape of a polygon the rounded angles of which form the wedging inclines.

Figs. 6 and 7 illustrate a control about a fixed shaft A, the lever L controls in all positions the arm B connected to the mechanical member the displacement of which is to be effected. It will be seen that the lever L in its displacement, for instance from right to left, Fig. 6, unwedges the ball 21 by means of the claw 23 and, continuing its displacement until it is rendered rigid with the member B by the portion P forming one piece with lever L which will then abut. The same thing takes place from left to right, the ball 22 being unwedged by the claw 24; but the arm B cannot control lever L as the balls 21, 22 render the arm B rigid with the shaft A in both directions of gyration. The screw 26 holds the counter-plate 25 from pressing the arm B against the lever L. The lever is moved axially by hand or by any suitable mechanical transmission.

A spring 27 can be interposed between lever L and arm B, Fig. 8, the claws 23 and 24 will have a conical shape in order to allow the spacing apart of balls 21 and 22 and their unwedging from the incline upon axial displacement of lever L against arm B. At this moment the desired movement of rotation can be imparted.

In the case above described, there are thus two operations: (1) axial operation having for effect to produce the unwedging—(2) rotary operation having for effect to control arm B by means of lever L, the portion P connecting the two members being provided, in this case, without other play than that necessary for the normal sliding movement of both members. In position of rest, the spring 27 pushing lever L will release claws 23 and 24, the balls 21 and 22 pushed by their springs will lock arm B and the fixed shaft A, whereby irreversibility is obtained.

The device proposed is also applicable to a rectilinear or curvilinear movement of any nature whatever. The operation is identical.

Figs. 9 and 10 illustrate a fixed shaft X on which move, on the one hand, a connecting member N connected to the control, and, on the other hand, a member O connected to the member to be controlled. It will be seen that when member N moves from right to left, the balls 31, 32, 33, 34 corresponding to the ball race C will be unwedged from the shaft X before the member N drives the member O. The same takes place from left to right: the balls 35, 36, 37, 38 of the ball race D will be unwedged from the shaft X before member N abuts against member O and drives it.

It will be seen that member O cannot freely move as the balls render member O rigid with the shaft X. This shaft X is rigid with any damping device such as indicated at X' in Fig. 9, which limits the displacements of the driven member by damping its reactions. The action of the spring 39 pushing the ball races C, D and their corresponding balls against their respective inclines obtained by machining member O, will determine the locking of member O and shaft X.

I claim:

1. A control mechanism comprising a driving member, a driven member and a reaction member, means for transmitting motion from the driving member to the driven member, the said driven member being provided with recesses forming, with a surface of said reaction member, V-shaped housings directed in opposite directions, rolling bodies placed in said housings and wedging between the reaction member and the driven member when the latter tends to move, unlocking means mounted on the said driving member and adapted to unwedge said rolling bodies, the said reaction member being mounted to be movable, and means for controlling the movements of the said reaction member.

2. A control mechanism comprising a driving member, a driven member and a reaction member, means for transmitting motion from the driving member to the driven member, locking means normally locking the driven member to the reaction member, said locking means being adapted to be unlocked by the driving member, the reaction member being mounted to be movable, and an adjustable brake controlling the movements of the reaction member.

3. A control mechanism comprising a driving member, a driven member and a reaction member, means for transmitting motion from the driving member to the driven member, locking means normally locking the driven member to the reaction member, said locking means being adapted to be unlocked by said driving member, the reaction member being rotatably mounted, a crown wheel connected to the said reaction member, and a worm engaging the said crown wheel.

4. A control mechanism comprising a driving member, a driven member and a reaction member, means for transmitting motion from the driving member to the driven member, the said driven member being provided with recesses forming, with a surface of said reaction member, V-shaped housings directed in opposite directions, rolling bodies placed in said housings and wedging between the reaction member and the driven member when the latter tends to move, unlocking means mounted on said driving member and adapted to unwedge said rolling bodies, the said reaction member being mounted to be movable and an adjustable brake controlling the movements of said reaction member.

5. A control mechanism comprising a driving member, a driven member and a reaction member, means for transmitting motion from the driving member to the driven member, the said driven member being provided with recesses forming, with a surface of said reaction member, V-shaped housings directed in opposite directions, rolling bodies placed in said housings and wedging between the reaction member and the driven member when the latter tends to move, unlocking means mounted on said driving member and adapted to unwedge said rolling bodies, the said reaction member being mounted to be movable, a toothed member connected to said reaction member, a worm engaging said toothed member, and means for rotating said worm.

6. A control mechanism comprising a driving member, a driven member and a reaction member, means for transmitting rotation from the driving member to the driven member, the said driven member being provided with recesses forming, with a surface of said reaction member, V-shaped housings directed in opposite directions, rolling bodies placed in said housings and wedging between the reaction member and the driven member when the latter tends to move, unlocking means mounted on said driving member and adapted to unwedge the said rolling bodies, the said reaction member being mounted so as to be able to rotate, and means for controlling the rotations of the said reaction member.

7. A control mechanism comprising a driving member, a driven member and a reaction member, means for transmitting rotation from the driving member to the driven member, the said driven member being provided with recesses forming, with a surface of said reaction member, V-shaped housings directed in opposite directions, rolling bodies placed in said housings and wedging between the reaction member and the driven member when the latter tends to move, unlocking means mounted on said driving member and adapted to unwedge the said rolling bodies, the said reaction member being mounted so as to be able to rotate, and an adjustable brake controlling the rotations of said reaction member.

8. A control mechanism comprising a driving member, a driven member and a reaction member, means for transmitting rotation from the driving member to the driven member, the said driven member being provided with recesses forming, with a surface of said reaction member, V-shaped housings directed in opposite directions, rolling bodies placed in said housings and wedging between the reaction member and the driven member when the latter tends to move, unlocking means mounted on said driving member and adapted to unwedge the said rolling bodies, the said reaction member being mounted so as to be able to rotate, a crown wheel connected to said reaction member, a worm engaging said crown wheel, and means for rotating said worm.

9. A control mechanism comprising a shaft, a driving member and a driven member both mounted so as to be able to slide longitudinally on the said shaft, the said driving member being adapted to impart movements to the driven member, the said driven member having recesses forming with the surface of the shaft V-shaped housings directed in opposite directions, rolling bodies placed in said housings and wedging between the said shaft and driven member when the latter tends to move, unlocking means mounted on the said driving member and adapted to unwedge the said rolling bodies, the said shaft being mounted so as to be movable longitudinally, and damping means connected to the said shaft.

RENÉ BENJAMIN HOUPLAIN.